United States Patent
Liu (10) Patent No.: US 8,338,745 B2
(45) Date of Patent: Dec. 25, 2012

(54) APPARATUS AND METHODS FOR DRILLING HOLES WITH NO TAPER OR REVERSE TAPER

(75) Inventor: Xinbing Liu, Acton, MA (US)

(73) Assignee: Panasonic Corporation, Osaka (JP)

(*) Notice: Subject to any disclaimer, the term of this patent is extended or adjusted under 35 U.S.C. 154(b) by 503 days.

(21) Appl. No.: 12/632,143

(22) Filed: Dec. 7, 2009

(65) Prior Publication Data

US 2011/0132881 A1 Jun. 9, 2011

(51) Int. Cl.
*B23K 26/00* (2006.01)
(52) U.S. Cl. ............ 219/121.71; 219/121.7; 219/121.78
(58) Field of Classification Search ............... 219/121.7, 219/121.71, 121.76, 121.78, 121.79
See application file for complete search history.

(56) References Cited

U.S. PATENT DOCUMENTS

| | | | | |
|---|---|---|---|---|
| 5,973,290 A * | 10/1999 | Noddin | ...... | 219/121.7 |
| 6,359,255 B1 * | 3/2002 | Yamamoto et al. | ...... | 219/121.71 |
| 6,531,678 B2 * | 3/2003 | Yamamoto | ...... | 219/121.71 |
| 6,720,567 B2 * | 4/2004 | Fordahl et al. | ...... | 250/559.29 |
| 7,880,117 B2 * | 2/2011 | Li et al. | ...... | 219/121.7 |
| 2004/0164060 A1 * | 8/2004 | Maeda et al. | ...... | 219/121.71 |

* cited by examiner

*Primary Examiner* — Kevin M Picardat
(74) *Attorney, Agent, or Firm* — RatnerPrestia (57) ABSTRACT

Apparatus and methods for drilling holes in a material with a laser are disclosed. An apparatus for drilling holes in a material with a laser includes a first steering element, a second steering element, and a lens. The first steering element is positioned to steer a beam from the laser. The second steering element is positioned to steer the beam from the first steering element. The lens focuses the beam from the second steering element. The first and second steering elements are configured to move with respect to the beam. Moving the first and second steering elements changes an angle of the beam where it contacts the material. The apparatus is operable to drill holes having no taper or reverse taper.

22 Claims, 9 Drawing Sheets

APPARATUS AND METHODS FOR DRILLING HOLES WITH NO TAPER OR REVERSE TAPER

FIELD OF THE INVENTION

The present invention relates generally to apparatus and methods for laser drilling, and more particularly, to laser drilling of holes with no taper or reverse taper.

BACKGROUND OF THE INVENTION

Laser micromachining can be employed in many applications, such as the fabrication of a strip die for plasma display panel (PDP) phosphor printing. Laser drilling holes may generally be performed by percussion drilling, trepanning, or milling. For percussion drilling, the laser beam may simply be focused at one position on the material. For trepanning, the laser beam may follow an outer contour of the hole to be drilled. For milling, the laser beam may follow a spiraling path to ablate the material. Each of these processes applies the laser beam to the material at normal incidence. Drilling holes with laser beams using these processes generally produces tapered holes, i.e., holes for which the entrance diameter is larger than the exit diameter. However, for certain applications, it may be desirable to drill holes with no taper or with reverse taper.

SUMMARY OF THE INVENTION

Aspects of the present invention are directed to apparatus and methods for drilling holes in a material with a laser. In accordance with an aspect of the present invention, an apparatus for drilling holes in a material with a laser comprises a first steering element, a second steering element, and a lens. The first steering element is positioned to steer a beam from the laser. The second steering element is positioned to steer the beam from the first steering element. The lens focuses the beam from the second steering element. The first and second steering elements are configured to move with respect to the beam. Moving the first and second steering elements changes an angle of the beam where it contacts the material.

In accordance with another aspect of the present invention, a method for drilling holes in a material with a laser includes steering the beam with a first steering element, steering the beam from the first steering element with a second steering element, focusing the beam from the second steering element on the material, and changing an angle of the beam where it contacts the material by moving the first and second steering elements relative to the beam.

BRIEF DESCRIPTION OF THE DRAWINGS

The invention is best understood from the following detailed description when read in connection with the accompanying drawings. It is emphasized that, according to common practice, the various features of the drawings are not to scale. On the contrary, the dimensions of the various features may be arbitrarily expanded or reduced for clarity. Included in the drawings are the following figures.

DETAILED DESCRIPTION OF THE INVENTION

The exemplary apparatus and methods disclosed herein are suitable for laser drilling of round holes or oval-shaped holes in materials. The exemplary apparatus and methods disclosed herein may be particularly suitable for drilling holes having a diameter on the order of tens of micron, e.g., from about 10 µm to about 100 µm. It is contemplated that aspects of the present invention may be used for laser micromachining holes of any shape in any suitable material without departing from the scope of the present invention.

Figure 1:
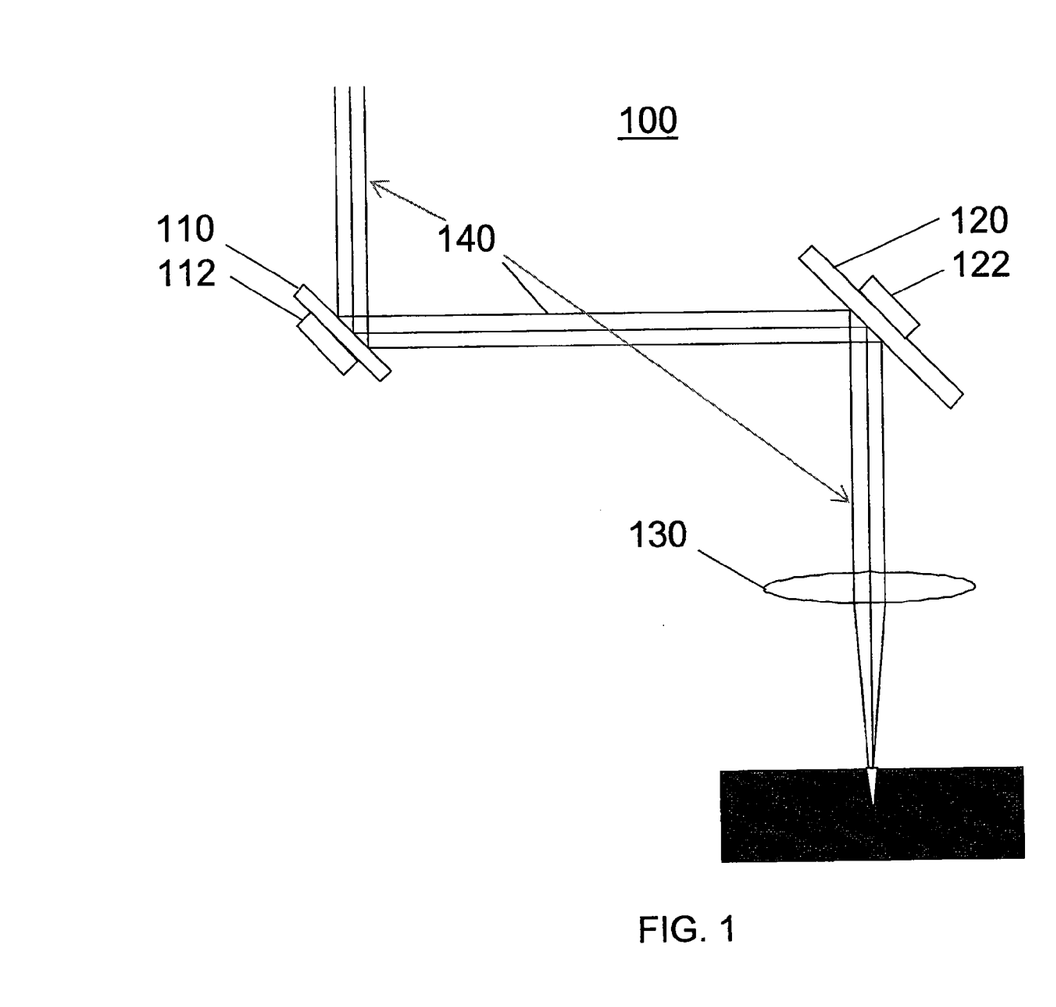
FIG. 1 is a diagram of an apparatus for drilling holes with a laser in accordance with aspects of the present invention.

Referring now to the drawings, FIG. 1 is a diagram of an exemplary apparatus 100 for drilling holes in accordance with an aspect of the present invention. Apparatus 100 may be used to laser drill holes in material having substantially no taper or holes having reverse taper. As used herein, a hole with substantially no taper is a hole having substantially the same entrance diameter as exit diameter. A hole having reverse taper is a hole for which the exit diameter is larger than the entrance diameter.

As a general overview, apparatus 100 includes a first steering element 110, a second steering element 120, and a lens 130. Additional details of apparatus 100 are described below.

First steering element 110 steers a beam from a laser. Apparatus 100 is used in conjunction with a laser (not shown). The laser produces a beam 140 for drilling the hole in the material. First steering element 110 is positioned to receive beam 140 from the laser and steer the beam 140. In an exemplary embodiment, first steering element 110 is a scan mirror.

First steering element 110 is configured to move with respect to beam 140. First steering element 110 may include a first movement element 112 for moving first steering element 110. As will be further described herein, moving first steering element 110 with first movement element 112 may change the angle and/or position of beam 140 where it contacts the material to be drilled. In an exemplary embodiment, first movement element 112 comprises at least one piezoelectric actuator. At least one piezoelectric actuators may desirably be a PZT actuators. Other suitable piezoelectric actuators will be known to one of ordinary skill in the art. A piezoelectric actuator may be configured to move the first steering element 110 in one dimension. Thus, first movement element 112 may include two piezoelectric actuators for moving the first steering element 110 in two dimensions. In an alternative exemplary embodiment, first movement element 112 comprises a galvanometer. The galvanometer may be configured to move the first steering element 110 in two dimensions. Suitable galvanometers for movement element 112 will be known to one of ordinary skill in the art.

Second steering element 120 steers the beam 140 from the first steering element 110. Steering element 120 is positioned to receive beam 140 from the first steering element 110 and steer the beam 140. In an exemplary embodiment, second steering element 120 is also a scan mirror.

Similarly to first steering element 110, second steering element 120 is configured to move with respect to beam 140. Second steering element 120 may include a second movement element 122 for moving second steering element 120. As will be further described herein, moving second steering element 120 with second movement element 122 may change the angle and/or position of beam 140 where it contacts the material to be drilled. Second movement element 122 may be at least one piezoelectric actuator or may be a galvanometer, as described above with respect to first movement element 112.

First and second movement elements 112 and 122 are configured to coordinate the movement of first and second steering elements 110 and 120. For example, first and second movement elements 112 and 122 may move the steering elements at the same time. First and second movement elements 112 and 122 may desirably move the steering elements in the same ways, i.e., synchronously. Alternatively, first and second movement elements 112 and 122 may move the steering elements in different ways. The movement of first and second steering elements 110 and 120 will be further described herein.

Lens 130 focuses the beam 140 from the second steering element 120. Lens 130 focuses beam 140 on the material to be drilled. In an exemplary embodiment, lens 130 is a focusing lens. Other suitable lenses 130 for focusing beam 140 will be known to one of ordinary skill in the art from the description herein.

Figure 2:
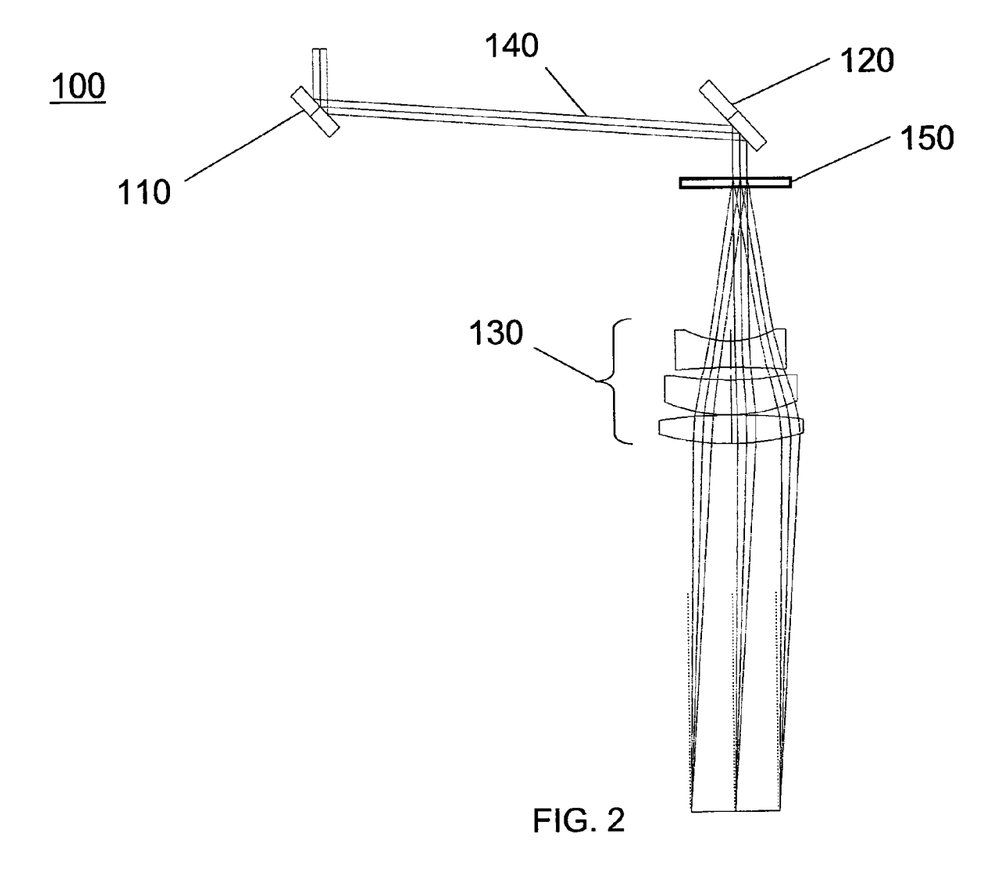
FIG. 2 is a diagram of an apparatus for drilling multiple holes with a laser in accordance with aspects of the present invention.

As illustrated in FIG. 2, apparatus 100 may further comprise a beam splitting element 150. Beam splitting element 150 splits the laser beam 140 from the second steering element 120 into multiple beams. This may allow for the simultaneous drilling of multiple holes in the material. In an exemplary embodiment, beam splitting element 150 is a diffractive optical element. A diffractive optical element may split beam 140 such that multiple beams propagate in different directions. As such, in this embodiment, it may be desirable to use a telecentric scan lens in order to focus the beams in a parallel direction toward the material. The telecentricity of the scan lens makes each beam axis strike the work piece at the same angle. Therefore, multiple holes having the same shape can be drilled at the same time. Beam splitting element 150 may alternatively include a mask having multiple openings for passing portions of the beam. This embodiment may further include a beam expander including a diverging lens and a collimating lens to expand the beam on the mask. Other suitable beam splitters will be known to one of ordinary skill in the art from the description herein.

Figure 3:
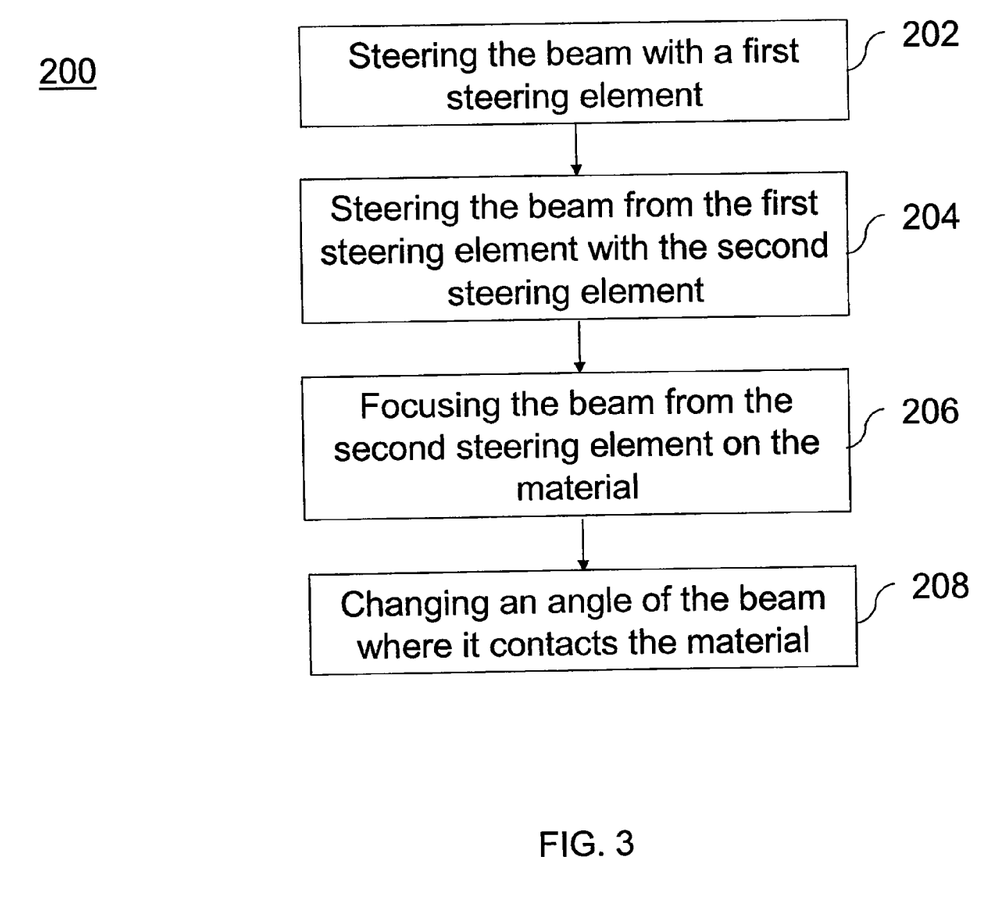
FIG. 3 is a flowchart illustrating an exemplary method for drilling holes in a material in accordance with aspects of the present invention.

FIG. 3 is a flow chart illustrating an exemplary method 200 for drilling holes in a material with a laser in accordance with an aspect of the present invention. Method 200 may be used to drill holes having substantially no taper or holes having reverse taper. As an overview, method 200 includes steering a laser beam with a first steering element, steering the beam from the first steering element with a second steering element, focusing the beam from the second steering element on a material, and changing an angle of the beam where it contacts the material. For the purposes of illustration, method 200 will be described with reference to the components of apparatus 100. Additional details of method 200 are described below.

In step 202, the beam from a laser is steered with a first steering element. In an exemplary embodiment, first steering element 110 steers beam 140 from the laser. As described above, first steering element 110 may be a scan mirror for reflecting beam 140.

In step 204, the beam from the first steering element is steered with a second steering element. In an exemplary embodiment, second steering element 120 steers beam 140 from the first steering element. As described above, second steering element may also be a scan mirror for reflecting beam 140.

In step 206, the beam from the second steering element is focused on a material. In an exemplary embodiment, lens 130 focuses the beam 140 on the material to be drilled. As described above, lens 130 may desirably be a telecentric scan lens.

In step 208, an angle of the beam where it contacts the material is changed. In an exemplary embodiment, the angle of beam 140 where it contacts the material is changed by moving first and second steering elements 110 and 120 relative to beam 140. Exemplary ways of moving first and second steering elements 110 and 120 will now be described with reference to FIGS. 1, 4, and 5.

FIG. 1 illustrates apparatus 100 in a reference position. In the reference position, apparatus 100 steers beam 140 such that beam 140 contacts the material at normal incidence (i.e., at an angle perpendicular to the surface of the material). In this reference position, a hole having normal taper may be drilled in the material.

Figure 4:
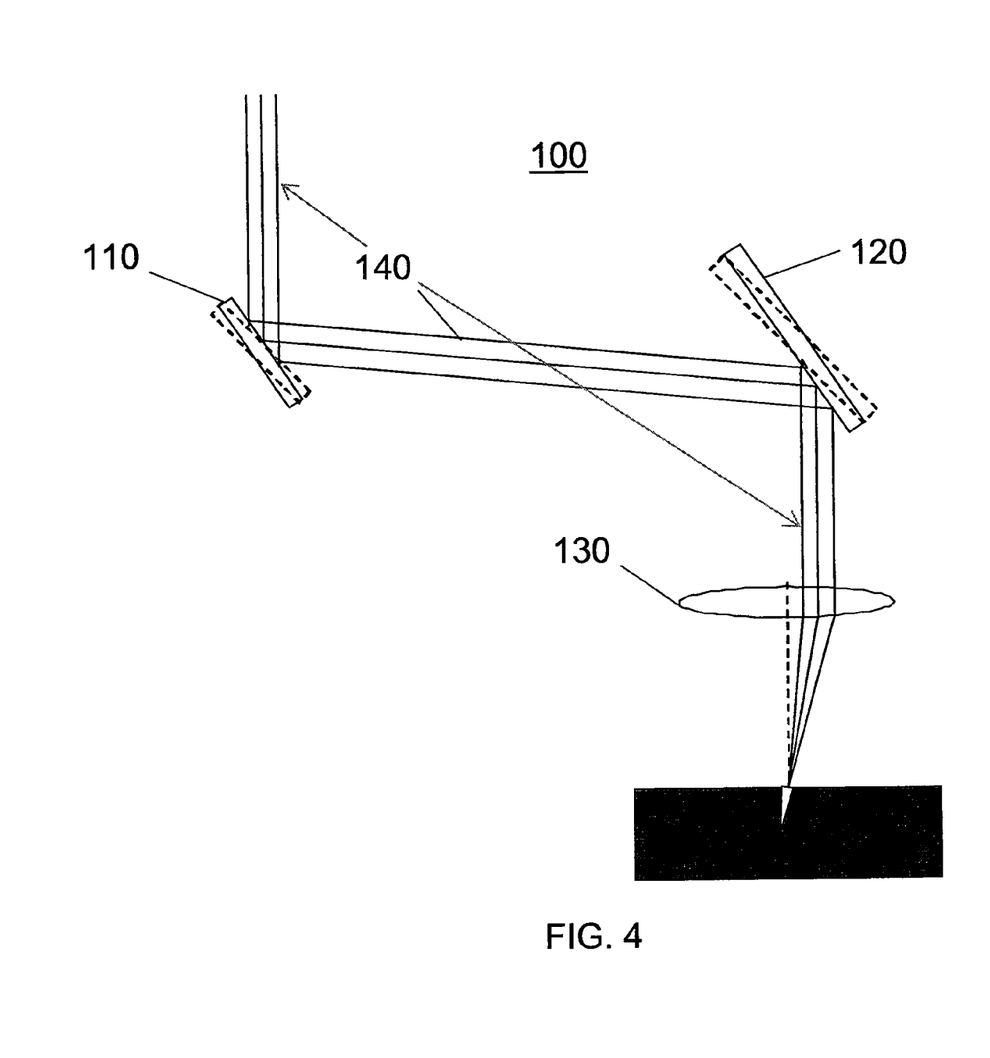
FIG. 4 is another diagram of the apparatus of FIG. 1.

FIG. 4 illustrates one way of moving first and second steering elements 110 and 120. As described above, first and second steering elements 110 and 120 are configured to move with respect to beam 140. In FIG. 4, first and second steering elements 110 and 120 are tilted to the same degree. Because both steering elements are moved at the same angle, the beam 140 from steering element 120 is still parallel to the axis of lens 130.

First and second steering elements 110 and 120 may further be configured to rotate relative to the beam, so that the beam 140 from the second steering element 120 rotates around the axis of the lens 130. First and second steering elements 110 and 120 may be rotated by applying a sine wave movement to the steering element in one direction and a cosine wave movement in a perpendicular direction. For example, moving element 112 may include a first piezoelectric (PZT) actuator in the x-direction (x-PZT actuator) and a second piezoelectric (PZT) actuator in the y-direction. The x-PZT actuator may receive a sine wave movement, causing steering element 110 to rotate about the x-axis, while the y-PZT actuator may receive a cosine wave movement, causing 110 to rotate in the y-axis direction. These movements may cause steering element 110 to rotate. It may be desirable to rotate first and second steering elements 110 and 120 synchronously (i.e. in identical motions), so that the beam from second steering element 120 will always remain parallel to the axis of lens 130.

As illustrated in FIG. 4, while beam 140 from the second steering element 120 is parallel to the lens axis, it is also shifted from the lens axis due to the tilt of first and second steering elements 110 and 120. Thus, when the beam 140 is focused by the lens, the beam 140 strikes the material at the same point as it does in the reference position, e.g., at a point along the axis of the lens. However, the beam now forms a non-perpendicular angle with the material.

The angle of the beam may desirably substantially cancel out the normal taper generated by the beam. Thus, the beam may drill a hole having substantially no taper (i.e., a hole with walls perpendicular to the surface of the material). Alternatively, the angle of the beam may desirably exceed the normal taper generated by the beam. Thus, the beam may drill a hole having reverse taper (i.e., a hole that is wider on the exit side than it is on the entrance side of the laser beam. The angle at which the beam contacts the material may be adjusted based on the angle of first and second steering elements 110 and 120. The greater the angle of the steering elements (with respect to their reference position), the farther removed from the lens axis the beam 140 will be, and the greater the angle (with respect to normal incidence) that will be formed by the laser where it contacts the material.

Because the beam strikes the same position on the material, rotating the steering elements as illustrated in FIG. 4 may allow for the percussion drilling of round or circular holes having substantially no taper or reverse taper.

Figure 5:
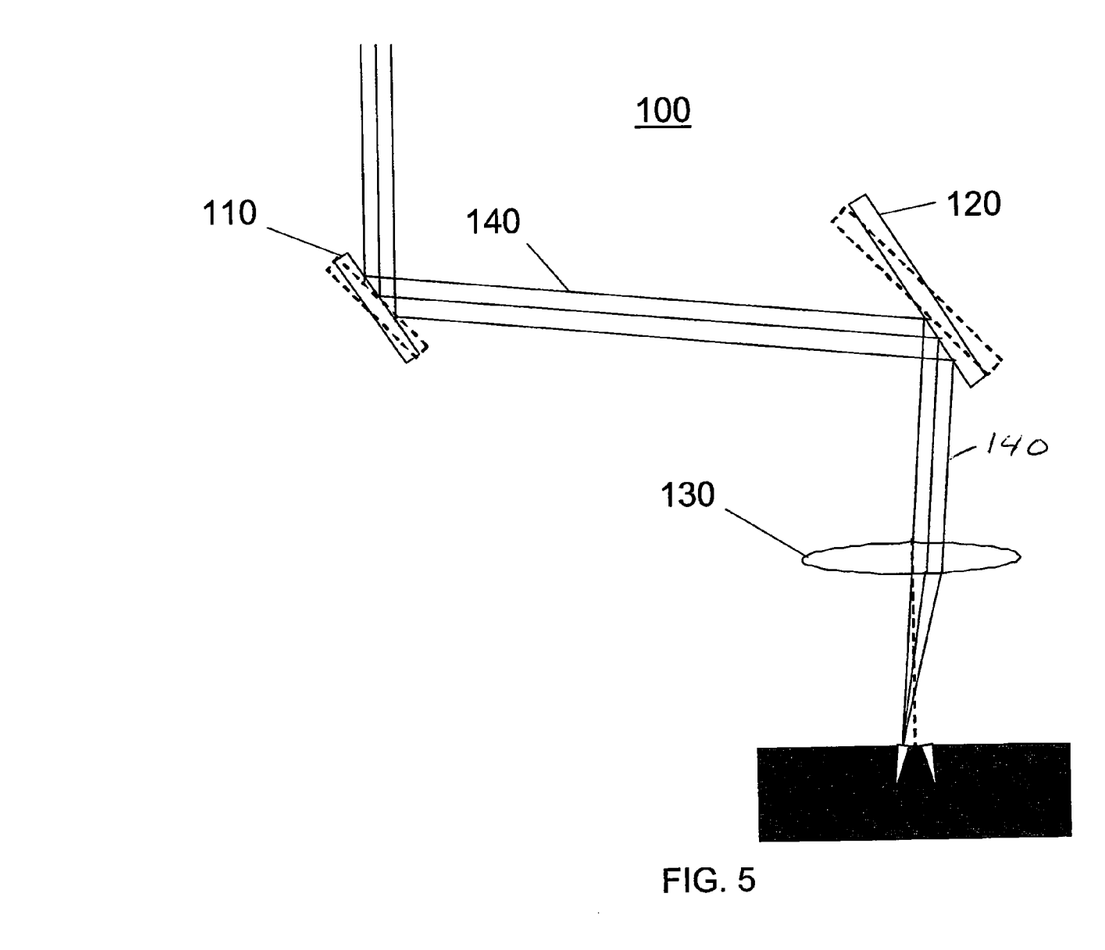
FIG. 5 is still another diagram of the apparatus of FIG. 1.

FIG. 5 illustrates another way of moving first and second steering elements 110 and 120. In FIG. 5, while first and second steering elements 110 and 120 are synchronously moved, they are tilted by different amounts. Because both steering elements are moved by different amounts, the beam 140 from steering element 120 is not parallel to the axis of lens 130.

First and second steering elements 110 and 120 may further be configured to rotate relative to the beam, so that the beam 140 from the second steering element 120 rotates around the axis of the lens 130. It may be desirable to rotate first and second steering elements 110 and 120 synchronously (i.e. in corresponding motions), so that the beam from second steering element 120 will always remain at the same angle to the axis of lens 130.

As illustrated in FIG. 5, because beam 140 is not parallel to the axis of the lens, when the beam 140 is focused by the lens, the beam 140 strikes the material at a different point than it does in the reference position, e.g., at a point removed from the axis of the lens. The beam also forms a non-perpendicular angle with the material.

The angle of the beam may desirably substantially cancel out or exceed the normal taper generated by the beam, as described above with respect to FIG. 4. The angle at which the beam contacts the material may be adjusted based on the angle of first and second steering elements 110 and 120, as described above with respect to FIG. 4.

Because the beam strikes a different position on the material, rotating the steering elements as illustrated in FIG. 4 causes the beam to rotate around a point along the axis of the lens. Rotating the steering elements using sine and cosine waves having the same amplitude (as described above) may allow for milling of round or circular holes having substantially no taper or reverse taper. Additionally, the rotation of the steering elements 110 and 120 may be adjusted such that shapes other than circles can be drilled. For example, by continuously increasing or decreasing the amplitudes of the sine and cosine waves, steering elements 110 and 120 may rotate such that the laser beam produces a spiraling path. For another example, by rotating the steering elements using sine and cosine waves having different amplitudes, oval-shaped holes may be drilled.

Method 200 may further comprise splitting the beam from the second steering element with a beam splitting element. In an exemplary embodiment, beam splitting element 150 splits the beam 140 from second steering element 120 into multiple beams. Lens 130 may then be used to focus the beams in a parallel direction toward the material. Thus, multiple holes may be drilled in the material simultaneously.

Figure 6:
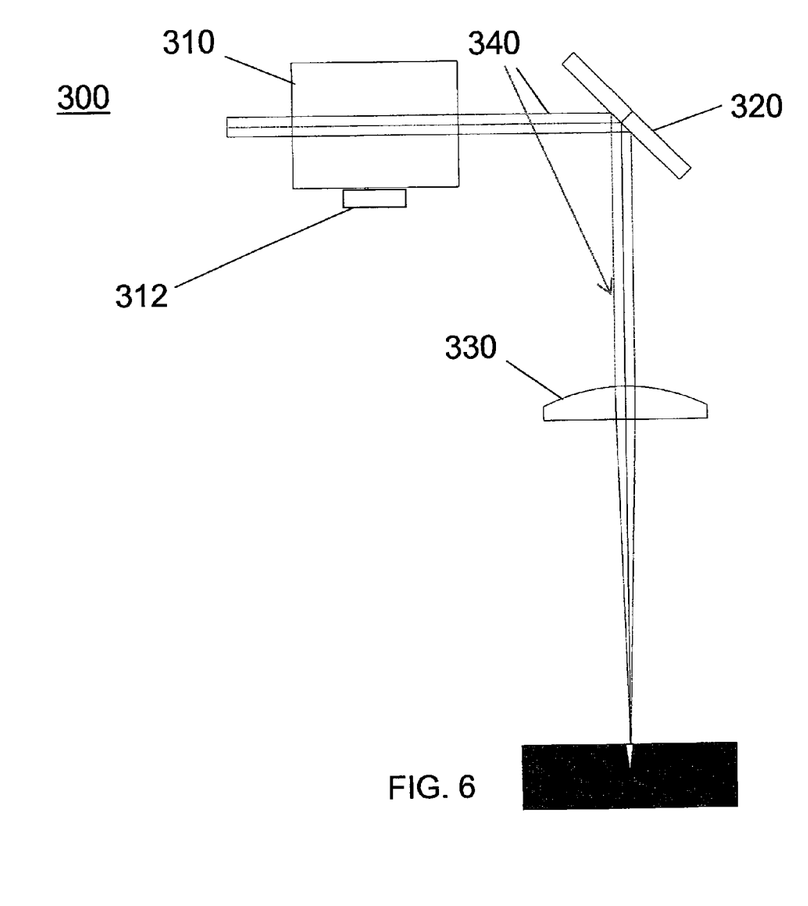
FIG. 6 is a diagram of another exemplary apparatus for drilling holes with a laser in accordance with aspects of the present invention.

FIG. 6 is a diagram of another exemplary apparatus 300 for drilling holes in accordance with an aspect of the present invention. Apparatus 300 may be used to laser drill holes in material having substantially no taper or holes having reverse taper. As a general overview, apparatus 300 includes a first steering element 310, a second steering element 320, and a lens 330. Apparatus 300 is substantially the same as apparatus 100 except as described below.

First steering element 310 steers a beam from a laser. First steering element 310 is positioned to receive beam 340 from the laser and steer the beam 340. In an exemplary embodiment, first steering element 310 is a glass block. The glass block has two parallel surfaces intersecting the axis of beam 340. The glass block may steer beam 140 by refracting the beam as it passes through the glass block. First steering element 310 is configured to move with respect to beam 340, as described above with respect to first steering element 110. Accordingly, first steering element 310 includes a first movement element 312, as described above with respect to first movement element 112.

Second steering element 320 steers the beam from the first steering element 320. While second steering element 320 is illustrated as a scan mirror, it is understood that second steering element 320 may also be a glass block, or other suitable beam steering component. Second steering element 320 is configured to move with respect to beam 340, as described above with respect to second steering element 120.

Figure 7:
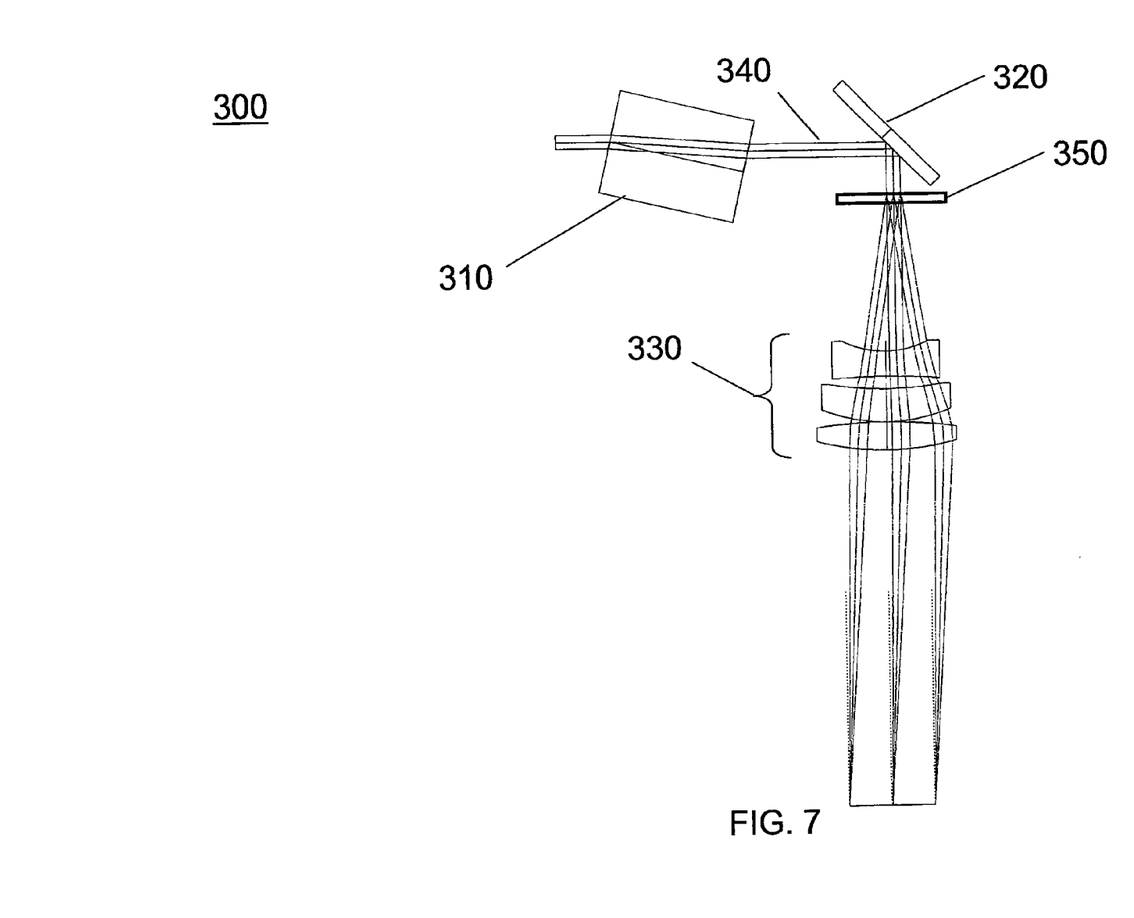
FIG. 7 is a diagram of an apparatus for drilling multiple holes with a laser in accordance with aspects of the present invention.

As illustrated in FIG. 7, apparatus 300 may further comprise a beam splitting element 350. Beam splitting element 350 splits the laser beam 340 from the second steering element 320 into multiple beams, as described above with respect to beam splitting element 350.

Exemplary ways of moving first and second steering elements 310 and 320 will now be described with reference to FIGS. 6, 8, and 9.

FIG. 6 illustrates apparatus 300 in a reference position. In the reference position, apparatus 300 steers beam 340 such that beam 340 contacts the material at normal incidence (i.e., at an angle perpendicular to the surface of the material). In this reference position, a hole having normal taper may be drilled in the material.

Figure 8:
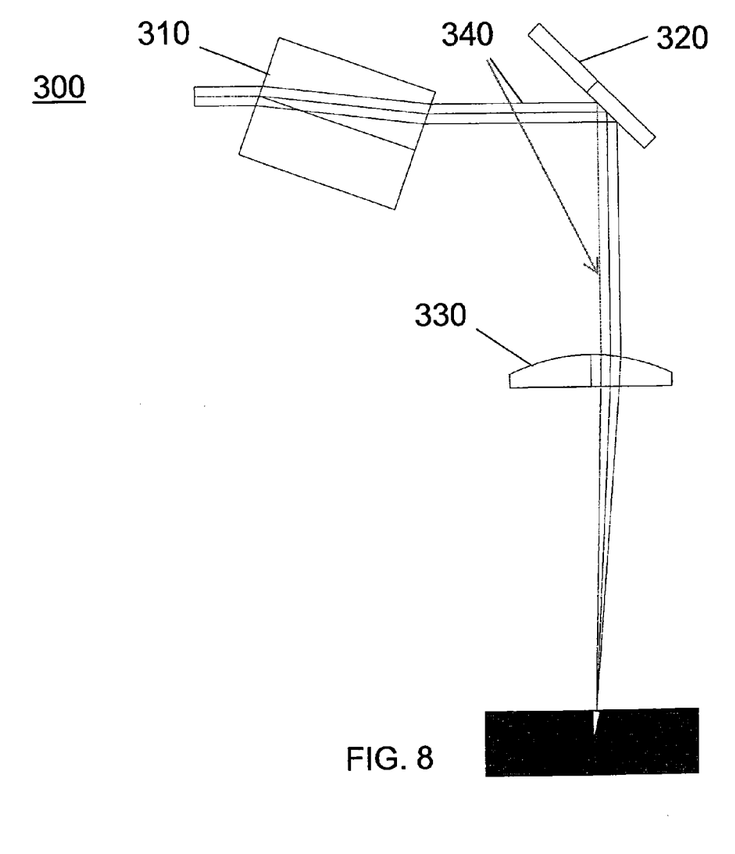
FIG. 8 is another diagram of the apparatus of FIG. 6.

FIG. 8 illustrates one way of moving first steering element 310. As described above, first and second steering elements 310 and 320 are configured to move with respect to beam 140. In FIG. 8, first steering element 310 is tilted. This causes beam 140 to shift its axis, but not its direction of propagation. It may not be necessary to move second steering element 320 in this embodiment.

First steering element 310 may further be configured to rotate relative to the beam, so that the beam 340 from the second steering element 320 rotates around the axis of the lens 330. As illustrated in FIG. 8, while beam 340 from the second steering element 320 is parallel to the lens axis, it is also shifted from the lens axis due to the tilt of first steering elements 310. Thus, when the beam 340 is focused by the lens, the beam 340 strikes the material at the same point as it does in the reference position, e.g., at a point along the axis of the lens. However, the beam now forms a non-perpendicular angle with the material.

The angle of the beam may desirably substantially cancel out or exceed the normal taper generated by the beam, as discussed above with respect to FIG. 4. The angle at which the beam contacts the material may be adjusted based on the angle of first steering element 310, as described above with respect to FIG. 4.

Because the beam strikes the same position on the material, rotating the steering elements as illustrated in FIG. 8 may allow for the percussion drilling of round or circular holes having substantially no taper or reverse taper.

Figure 9:
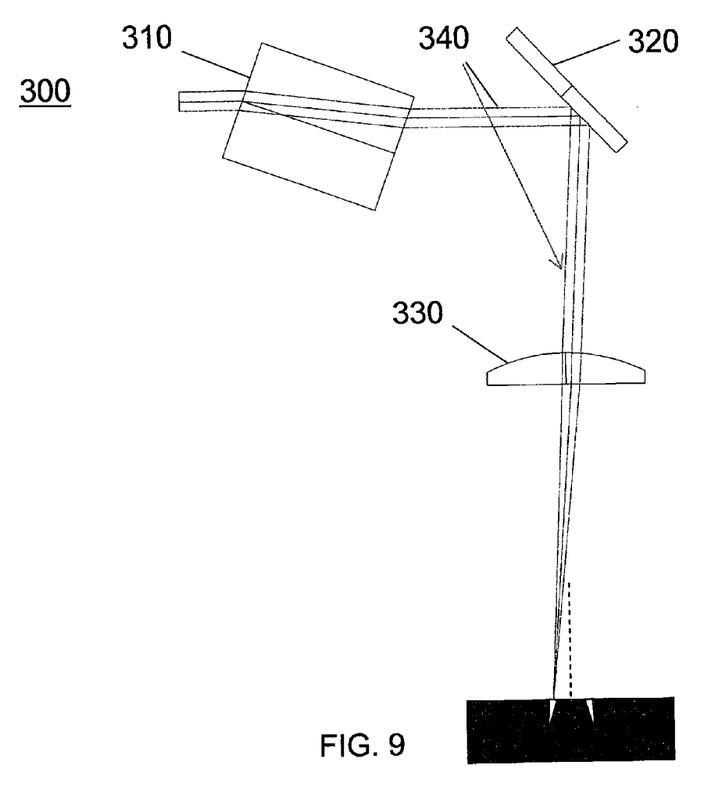
FIG. 9 is still another diagram of the apparatus of FIG. 6.

FIG. 9 illustrates another way of moving first and second steering elements 310 and 120. In FIG. 9, both first and second steering elements 310 and 320 are tilted. Because the second steering element 320 is tilted, the beam 340 from steering element 320 is not parallel to the axis of lens 330.

First and second steering elements 310 and 320 may further be configured to rotate relative to the beam, so that the beam 340 from the second steering element 320 rotates around the axis of the lens 330. It may be desirable to rotate first and second steering elements 310 and 320 synchronously, so that the beam from second steering element 320 will always remain at the same angle to the axis of lens 330.

As illustrated in FIG. 9, because beam 340 is not parallel to the axis of the lens, when the beam 340 is focused by the lens, the beam 340 strikes the material at a different point than it does in the reference position, e.g., at a point removed from the axis of the lens. The beam also forms a non-perpendicular angle with the material.

The angle of the beam may desirably substantially cancel out or exceed the normal taper generated by the beam, as discussed above with respect to FIG. 4. The angle at which the beam contacts the material may be adjusted based on the angle of first and second steering elements 310 and 320, as described above with respect to FIG. 4.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. An apparatus for drilling holes in a material with a laser comprising:
   a first steering element positioned to steer a beam from the laser;
   a second steering element positioned to steer the beam from the first steering element; and
   a lens for focusing the beam from the second steering element,
   wherein the first and second steering elements are configured to move with respect to the beam,
   moving the first and second steering elements changes an angle of the beam where it contacts the material, and
   at least one of the first and second steering elements is configured to move in a sine wave motion in one of two dimensions and in a cosine wave motion in the other one of the two dimensions.

2. The apparatus of claim 1, wherein moving the first and second steering elements further changes a position of the beam where it contacts the material.

3. The apparatus of claim 1, wherein the first and second steering elements are scan mirrors.

4. The apparatus of claim 1, wherein the first steering element is a glass block and the second steering element is a scan mirror.

5. The apparatus of claim 1, further comprising:
   at least one piezoelectric actuator coupled to the first steering element and configured to move the first steering element with respect to the beam in the two dimensions; and
   at least one piezoelectric actuator coupled to the second steering element and configured to move the second steering element with respect to the beam in the two dimensions,
   wherein the piezoelectric actuators coordinate the movement of the first and second steering elements.

6. The apparatus of claim 5, wherein:
   the at least one piezoelectric actuator coupled to the first steering element comprises a first and a second piezoelectric actuator,
   the first piezoelectric actuator is configured to move the first steering element in the sine wave motion in the one of the two dimensions, and
   the second piezoelectric actuator is configured to move the first steering element in the cosine wave motion in the other one of the two dimensions, and
   the at least one piezoelectric actuator coupled to the second steering element comprises a third and a fourth piezoelectric actuator,
   the third piezoelectric actuator is configured to move the second steering element in the sine wave motion in the one of the two dimensions, and
   the fourth piezoelectric actuator is configured to move the second steering element in the cosine wave motion in the other one of the two dimensions.

7. The apparatus of claim 1, further comprising:
   a first galvanometer coupled to the first steering element and configured to move the first steering element with respect to the beam in two dimensions; and
   a second galvanometer coupled to the second steering element and configured to move the second steering element with respect to the beam in two dimensions,
   wherein the first and second galvanometers coordinate the movement of the first and second steering elements.

8. The apparatus of claim 1, further comprising a beam splitting element for splitting the beam from the second steering element, and
   wherein the lens is a telecentric scan lens.

9. A method for drilling holes in a material with a laser, comprising the steps of:
   steering the beam with a first steering element;
   steering the beam from the first steering element with a second steering element;
   focusing the beam from the second steering element on the material; and
   changing an angle of the beam where it contacts the material by moving the first and second steering elements relative to the beam,
   wherein the moving comprises rotating at least one of the first and second steering elements relative to the beam by applying a sine wave motion to the at least one of the first and second steering elements in a first dimension and a cosine wave motion to the at least one of the first and second steering elements in a second dimension perpendicular to the first dimension.

10. The method of claim 9, wherein the changing step comprises:
    changing the angle and a position of the beam where it contacts the material by moving the first and second steering elements relative to the beam.

11. The method of claim 9, further comprising the step of:
    drilling a hole with reverse taper in the material with the laser.

12. The method of claim 9, wherein the moving step comprises:
    rotating both of the first and second steering elements relative to the beam by applying the sine wave motion to each of the first and second steering elements in the first dimension and the cosine wave motion to each of the first and second steering elements in the second dimension perpendicular.

13. The method of claim 9, wherein the moving step comprises:
    synchronously moving the first and second steering elements relative to the beam.

14. The method of claim 9, wherein the focusing step comprises:

focusing the beam on the material with a lens, the beam focused on a point on an axis of the lens.

15. The method of claim 9, wherein the focusing step comprises:
focusing the beam on the material with a lens, the beam focused on a point removed from the axis of the lens.

16. The method of claim 9, wherein the steering steps comprise:
steering the beam with a first scan mirror; and
steering the beam from the first scan mirror with a second scan mirror.

17. The method of claim 9, wherein the steering steps comprise:
steering the beam with a glass block; and
steering the beam from the glass block with a scan mirror.

18. The method of claim 9, wherein the focusing step comprises:
splitting the beam from the second steering element with a beam splitting element; and
focusing the beam from the beam splitting element on the material with a telecentric scan lens.

19. The apparatus of claim 1, wherein both of the first and second steering elements are configured to move in the sine wave motion in the one of two dimensions and in the cosine wave motion in the other one of the two dimensions.

20. The method of claim 9, further comprising the step of:
drilling a hole with substantially no taper in the material with the laser.

21. An apparatus for drilling holes in a material with a laser comprising:
a first steering element positioned to steer a beam from the laser;
a second steering element positioned to steer the beam from the first steering element;
a beam splitting element for splitting the beam from the second steering element into a plurality of beams; and
a telecentric scan lens for focusing the plurality of beams from the beam splitting element,
wherein the first and second steering elements are configured to move with respect to the beam, and
moving the first and second steering elements changes an angle of the beam where it contacts the material.

22. A method for drilling holes in a material with a laser, comprising the steps of:
steering the beam with a first steering element;
steering the beam from the first steering element with a second steering element;
splitting the beam from the second steering element into a plurality of beams with a beam splitting element;
focusing the plurality of beams from the beam splitting element on the material with a telecentric scan lens; and
changing an angle of the plurality of beams where they contact the material by moving the first and second steering elements relative to the beam.

* * * * *